US010375595B2

(12) United States Patent
Zhang et al.

(10) Patent No.: US 10,375,595 B2
(45) Date of Patent: Aug. 6, 2019

(54) MEASUREMENT AND REPORT OF SIGNAL TRANSMISSIONS IN LTE/LTE-A INCLUDING CONTENTION-BASED SHARED SPECTRUM

(71) Applicant: QUALCOMM Incorporated, San Diego, CA (US)

(72) Inventors: Xiaoxia Zhang, San Diego, CA (US); Wei Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 15/210,379

(22) Filed: Jul. 14, 2016

(65) Prior Publication Data

US 2017/0034728 A1 Feb. 2, 2017

Related U.S. Application Data

(60) Provisional application No. 62/199,766, filed on Jul. 31, 2015.

(51) Int. Cl.
*H04L 12/801* (2013.01)
*H04L 12/24* (2006.01)
(Continued)

(52) U.S. Cl.
CPC .......... *H04W 24/10* (2013.01); *H04B 17/309* (2015.01); *H04L 5/0048* (2013.01);
(Continued)

(58) Field of Classification Search
CPC .................. H04W 24/10; H04W 28/0273; H04W 28/10; H04W 16/14; H04W 24/02; H04B 17/336
See application file for complete search history.

(56) References Cited

U.S. PATENT DOCUMENTS

2012/0257568 A1* 10/2012 Cai ..................... H04L 1/1614
370/328
2012/0300712 A1* 11/2012 Hakola ............... H04W 74/008
370/329
(Continued)

OTHER PUBLICATIONS

CMCC: "On the Usage of UE RSSI Measurements," 3GPP Draft; R2-152514 on the Usage of UE RSSI Measurements, 3rd Generation Partnership Project (3GPP), Mobile Competence Centre ; 650, Route Des Lucioles ; F-06921 Sophia-Antipolis Cedex ; France vol. RAN WG2, No. Fukuoka, Japan; 20150525-20150529 May 24, 2015 (May 24, 2015), XP050972982, Retrieved from the Internet: URL:http://www.3gpp.org/ftp/Meetings_3GPP_SYNC/RAN2/ Docs/ [retrieved on May 24, 2015] chapter 2.1, chapter 2.2, chapter 2.3, chapter 2.4.
(Continued)

*Primary Examiner* — Faruk Hamza
*Assistant Examiner* — Abusayeed M Haque
(74) *Attorney, Agent, or Firm* — Norton Rose Fulbright US LLP

(57) ABSTRACT

Reporting and measurements of measurement signals transmitted as a part of LTE/LTE-A networks that include contention-based spectrum is disclosed. In one aspect, a user equipment (UE) performs measurement signal thresholding by estimating the noise associated with the measurement signal. The UE would then use a measured parameter of that signal based on the measurement signal exceeding the threshold as a candidate for a valid measured parameter.

24 Claims, 11 Drawing Sheets

(51) Int. Cl.

| | | |
|---|---|---|
| *H04W 84/14* | (2009.01) | |
| *H04L 29/06* | (2006.01) | |
| *H04L 12/28* | (2006.01) | |
| *H04W 24/10* | (2009.01) | |
| *H04W 74/08* | (2009.01) | |
| *H04L 5/00* | (2006.01) | |
| *H04B 17/309* | (2015.01) | |
| *H04W 24/08* | (2009.01) | |
| *H04W 24/02* | (2009.01) | |
| *H04W 16/14* | (2009.01) | |

(52) U.S. Cl.
CPC ........... *H04W 16/14* (2013.01); *H04W 24/02* (2013.01); *H04W 24/08* (2013.01); *H04W 74/08* (2013.01)

(56) References Cited

U.S. PATENT DOCUMENTS

| | | | |
|---|---|---|---|
| 2013/0208587 A1 | 8/2013 | Bala et al. | |
| 2014/0341135 A1 | 11/2014 | Bhushan et al. | |
| 2014/0376453 A1* | 12/2014 | Smith | H04W 74/0816 370/328 |
| 2015/0055588 A1 | 2/2015 | Yerramalli et al. | |
| 2015/0146677 A1* | 5/2015 | Ito | H04W 4/70 370/329 |
| 2015/0146680 A1 | 5/2015 | Luo et al. | |
| 2015/0172950 A1 | 6/2015 | Chen et al. | |
| 2015/0201429 A1* | 7/2015 | Chen | H04W 72/1226 370/329 |
| 2015/0280847 A1 | 10/2015 | Somasundaram et al. | |
| 2015/0334656 A1* | 11/2015 | Ji | H04W 52/0245 370/252 |
| 2016/0006539 A1* | 1/2016 | Nammi | H04L 1/0003 370/329 |
| 2016/0381646 A1* | 12/2016 | Li | H04W 74/0816 370/338 |
| 2017/0026867 A1* | 1/2017 | Huang | H04B 17/24 |
| 2017/0086214 A1* | 3/2017 | Kalhan | H04W 76/14 |

OTHER PUBLICATIONS

Ericsson: "RRM Measurements for LAA," 3GPP Draft; R2-152480—RRM Measurements for LAA, 3rd Generation Partnership Project (3GPP), Mobile Competence Centre ; 650, Route Des Lucioles ; F-06921 Sophia-Antipolis Cedex ; France vol. RAN WG2, No. Fukuoka, Japan; 20150525-20150529 May 15, 2015 (May 15, 2015), XP050972090, Retrieved from the Internet: URL:http://www.3gpp.org/ftp/tsg_ran/WG2_RL2/TSGR2_90/Docs/ [retrieved on May 15, 2015] chapter 2, chapter 2, chapter 2.1, chapter 2.2, chapter 2.3.

Huawei et al., "Considerations of Measurement Issues in LAA," 3GPP Draft; R2-152218, 3rd Generation Partnership Project (3GPP), Mobile Competence Centre; 650, Route Des Lucioles ; F-06921 Sophia-Antipolis Cedex ; France vol. RAN WG2, No. Fukuoka, Japan; 20150525-20150529 May 24, 2015 (May 24, 2015), XP050972582, Retrieved from the Internet: URL:http://www.3gpp.org/ftp/Meetings_3GPP_SYNC/RAN2/Docs/ [retrieved on May 24, 2015] chapter 2.1, chapter 2.3.

International Search Report and Written Opinion—PCT/US2016/042623—ISA/EPO—dated Oct. 14, 2016.

* cited by examiner

MEASUREMENT AND REPORT OF SIGNAL TRANSMISSIONS IN LTE/LTE-A INCLUDING CONTENTION-BASED SHARED SPECTRUM

CROSS-REFERENCE TO RELATED APPLICATIONS

This application claims the benefit of U.S. Provisional Patent Application No. 62/199,766, entitled, "MEASUREMENT AND REPORT OF SIGNAL TRANSMISSIONS IN LTE/LTE-A INCLUDING CONTENTION-BASED SHARED SPECTRUM," filed on Jul. 31, 2015, which is expressly incorporated by reference herein in its entirety.

BACKGROUND

Field

Aspects of the present disclosure relate generally to wireless communication systems, and more particularly, to measurement and report of signal transmissions in long term evolution (LTE)/LTE-Advanced (LTE-A) systems including contention-based shared spectrum.

Background

Wireless communication systems are widely deployed to provide various types of communication content, such as voice, video, packet data, messaging, broadcast, or the like. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel.

SUMMARY

In one aspect of the disclosure, a method of wireless communication includes receiving a reference signal over a contention-based frequency spectrum, measuring a signal parameter based on the reference signal, estimating a quality of the reference signal, and in response to the estimating the quality, processing the signal parameter for reporting to a base station.

In an additional aspect of the disclosure, a method of wireless communication includes receiving a signal parameter measurement from a UE over a contention-based frequency spectrum, performing a clear channel assessment (CCA) of the contention-based frequency spectrum, and in response to the CCA indicating the contention-based frequency spectrum is occupied, ignoring the signal parameter measurement from the UE, wherein the signal parameter measurement corresponds to a base station not being able to access the medium.

In an additional aspect of the disclosure, a method of wireless communication includes receiving an indication signal from a UE over a contention-based frequency spectrum, wherein the indication notifies a base station that the number of signal parameters measurements has failed to exceed the minimum measurement threshold, and performing communication management of a connection with the UE based on the indication signal.

In an additional aspect of the disclosure, an apparatus configured for wireless communication includes means for receiving a reference signal over a contention-based frequency spectrum, means for measuring a signal parameter based on the reference signal, means for estimating a quality of the reference signal, and means, executable in response to the estimation of the quality, for processing the signal parameter for reporting to a base station.

In an additional aspect of the disclosure, an apparatus configured for wireless communication includes means for receiving a signal parameter measurement from a UE over a contention-based frequency spectrum, means for performing a CCA of the contention-based frequency spectrum, and means, executable in response to the CCA indicating the contention-based frequency spectrum is occupied, for ignoring the signal parameter measurement from the UE, wherein the signal parameter measurement corresponds to a base station not being able to access the medium.

In an additional aspect of the disclosure, an apparatus configured for wireless communication includes means for receiving an indication signal from a UE over a contention-based frequency spectrum, wherein the indication notifies a base station that the number of signal parameters measurements has failed to exceed the minimum measurement threshold, and means for performing communication management of a connection with the UE based on the indication signal.

In an additional aspect of the disclosure, a non-transitory computer-readable medium having program code recorded thereon. The program code further includes code to receive a reference signal over a contention-based frequency spectrum, code to measure a signal parameter based on the reference signal, code to estimate a quality of the reference signal, and code, executable in response execution of the code to estimate the quality, to process the signal parameter for reporting to a base station.

In an additional aspect of the disclosure, a non-transitory computer-readable medium having program code recorded thereon. The program code further includes code to receive a signal parameter measurement from a UE over a contention-based frequency spectrum, code to perform a CCA of the contention-based frequency spectrum, and code, executable in response to the CCA indicating the contention-based frequency spectrum is occupied, to ignore the signal parameter measurement from the UE, wherein the signal parameter measurement corresponds to a base station not being able to access the medium.

In an additional aspect of the disclosure, a non-transitory computer-readable medium having program code recorded thereon. The program code further includes code to receive an indication signal from a UE over a contention-based frequency spectrum, wherein the indication notifies a base station that the number of signal parameters measurements has failed to exceed the minimum measurement threshold, and code to perform communication management of a connection with the UE based on the indication signal.

In an additional aspect of the disclosure, an apparatus configured for wireless communication is disclosed. The apparatus includes at least one processor, and a memory coupled to the processor. The processor is configured to receive a reference signal over a contention-based frequency spectrum, to measure a signal parameter based on the reference signal, to estimate a quality of the reference signal, and, in response to the estimation of the quality, to process the signal parameter for reporting to a base station.

In an additional aspect of the disclosure, an apparatus configured for wireless communication is disclosed. The apparatus includes at least one processor, and a memory coupled to the processor. The processor is configured to receive a signal parameter measurement from a UE over a contention-based frequency spectrum, to perform a CCA of the contention-based frequency spectrum, and, in response to the CCA indicating the contention-based frequency spectrum is occupied, to ignore the signal parameter measurement from the UE, wherein the signal parameter measurement corresponds to a base station not being able to access the medium.

In an additional aspect of the disclosure, an apparatus configured for wireless communication is disclosed. The apparatus includes at least one processor, and a memory coupled to the processor. The processor is configured to receive an indication signal from a UE over a contention-based frequency spectrum, wherein the indication notifies a base station that the number of signal parameters measurements has failed to exceed the minimum measurement threshold, and to perform communication management of a connection with the UE based on the indication signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
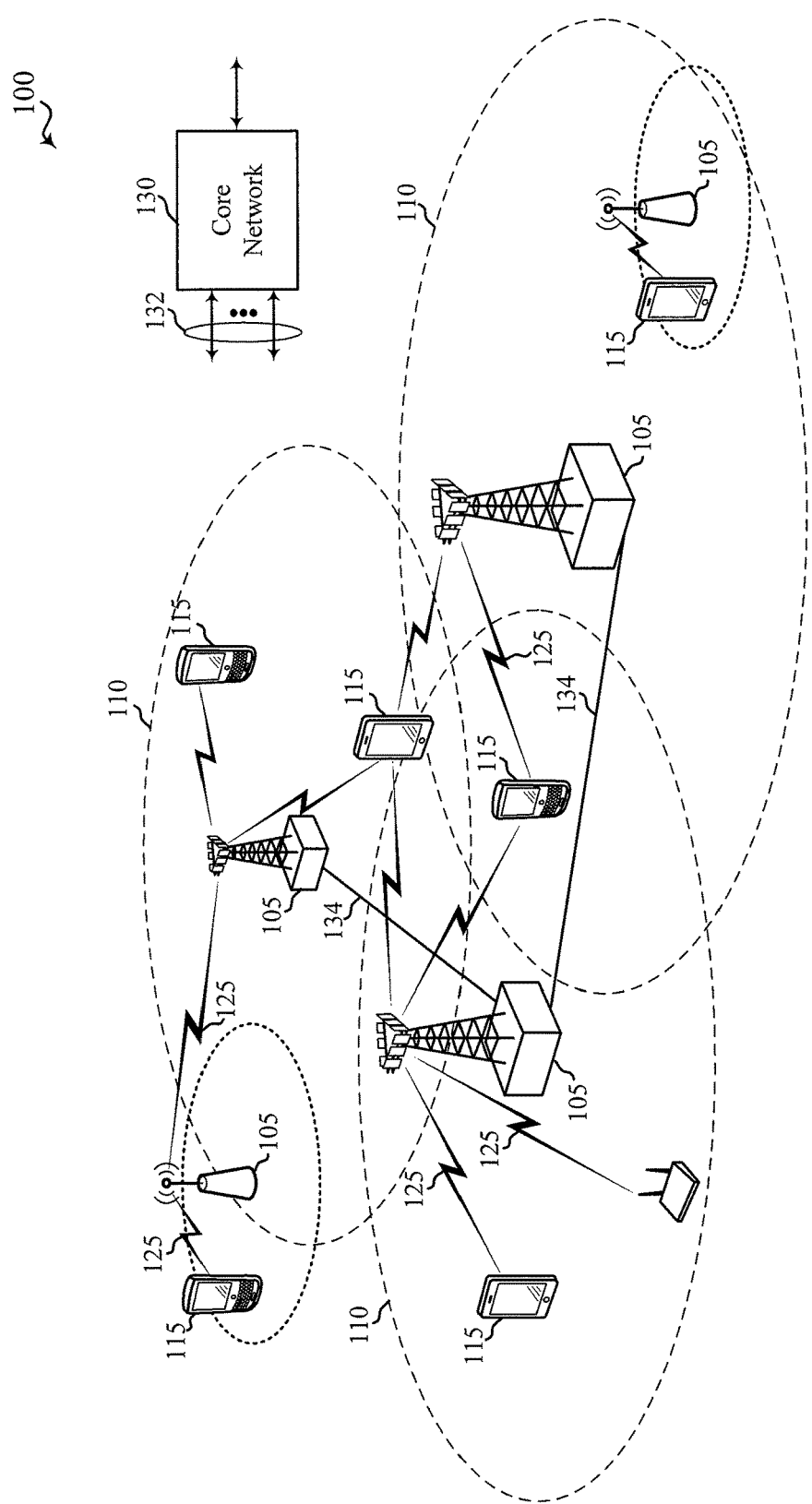
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Techniques are described in which an unlicensed radio frequency spectrum band is used for at least a portion of contention-based communications over a wireless communication system. In some examples, a contention-based shared radio frequency spectrum band may be used for Long Term Evolution (LTE) communications or LTE-Advanced (LTE-A) communications. The contention-based radio frequency spectrum band may be used in combination with, or independent from, a non-contention licensed radio frequency spectrum band. In some examples, the contention-based radio frequency spectrum band may be a radio frequency spectrum band for which a device may also need to contend for access because the radio frequency spectrum band is available, at least in part, for unlicensed use, such as WiFi use.

With increasing data traffic in cellular networks that use a licensed radio frequency spectrum band, offloading of at least some data traffic to a contention-based shared radio frequency spectrum band, such as in an unlicensed band, may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over a contention-based shared radio frequency spectrum band, such as unlicensed spectrum, devices may perform an LBT procedure to gain access to the shared radio frequency spectrum band. Such an LBT procedure may include performing a CCA procedure (or an extended CCA procedure) to determine whether a channel of the unlicensed radio frequency spectrum band is available. When it is determined that the channel of the contention-based radio frequency spectrum band is available, a channel reserving signal (e.g., a CUBS) may be transmitted to reserve the channel. When it is determined that a channel is not available, a CCA procedure (or extended CCA procedure) may be performed for the channel again at a later time.

When a base station and/or a UE includes multiple antenna ports capable of transmitting over the contention-based shared radio frequency spectrum band, transmissions from different antenna ports may interfere with one another due to correlation between transmitted signals. For a channel reserving signal used to reserve a channel of a contention-based shared radio frequency spectrum band, reduction of interference due to correlation between transmitted signals may be important to provide good detection capabilities for reserving the channel, and to prevent false detection that would unnecessarily reserve the channel and prevent other devices from using the channel. To reduce such interference due to cross-correlation of signals from different antennas or auto-correlation of a signal from a single antenna, the base station or the UE may generate a sequence based at least in part on an antenna port identifier associated with an antenna port that transmits the sequence of the channel reserving signal. In this way, correlation of channel reserving signals may be reduced, thereby improving detection capabilities of the signal transmission, resulting in more effective and accurate reservations of a channel of the contention-based shared radio frequency spectrum band.

In other words, for a channel reserving signal used to reserve a channel of an unlicensed radio frequency spectrum band, the channel reserving signal should be configured with good detectability to reduce false alarms, so that the channel reservation may be easily detected by other devices trying to access the shared radio frequency spectrum band. Thus, the channel reserving signal sequence should have good auto-correlation properties and good cross-correlation properties with sequences from neighbor base stations. For example, a primary synchronization signal (PSS), a secondary synchronization signal (SSS), and/or a channel state information-reference signal (CSI-RS) may not have good auto-correlation properties or good cross-correlation properties between different base stations in the contention-based shared radio frequency spectrum band. Thus, the channel reserving signal sequence should be configured based at least in part on an antenna port identifier to provide good auto-correlation and cross-correlation properties.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is an illustration of an example wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with other base stations 105 over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. Uplink transmissions may also include transmissions of data, which data may be transmitted over a physical uplink shared channel (PUSCH) or enhanced PUSCH (ePUSCH). Uplink transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIGS. 2A and 2B), or a scheduling request (SR) or enhanced SR (eSR) (e.g., in the standalone mode described with reference to FIGS. 2A and 2B). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a non-contention licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a contention-based shared radio frequency spectrum band (e.g., an unlicensed radio frequency spectrum band for which transmitting apparatuses may need to contend for access because the radio frequency spectrum band is available for unlicensed use, such as WiFi use). Upon winning a contention for access to the contention-based shared radio frequency spectrum band, a transmitting apparatus (e.g., a base station 105 or UE 115) may transmit one or more channel reserving signals (e.g., one or more CUBS) over the unlicensed radio frequency spectrum band. The channel reserving signals may serve to reserve the unlicensed radio frequency spectrum by providing a detectable energy on the unlicensed radio frequency spectrum band. The channel reserving signals may also serve to identify a transmitting apparatus and/or a transmitting antenna, or may serve to synchronize the transmitting apparatus and a receiving apparatus. In some examples, a channel reserving signal transmission may commence at a symbol period boundary (e.g., an OFDM symbol period boundary). In other examples, a CUBS transmission may commence between symbol period boundaries.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2A:
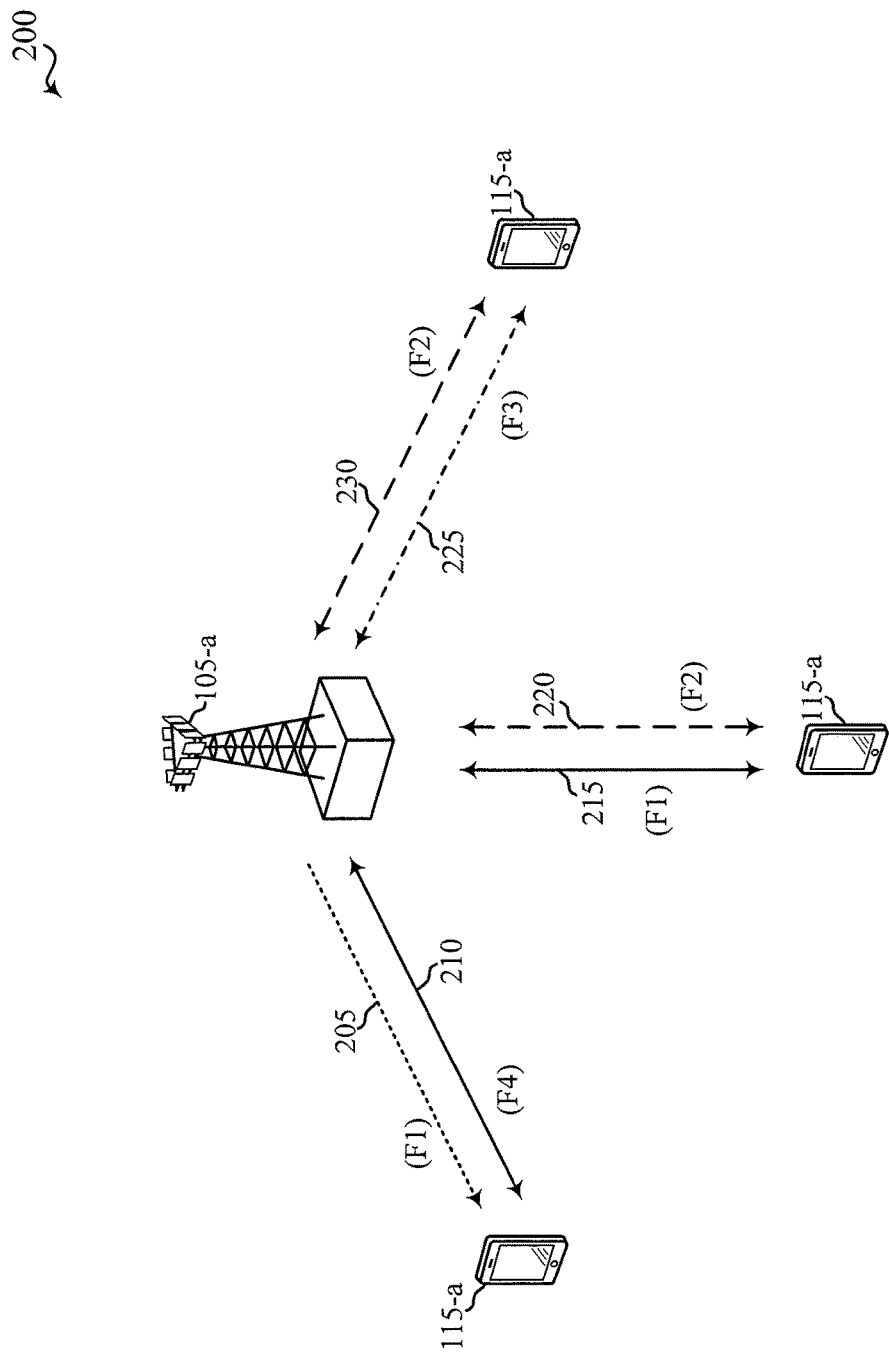
FIG. 2A shows a diagram that illustrates examples of deployment scenarios for using LTE in an unlicensed spectrum according to various embodiments.

Turning next to FIG. 2A, a diagram 200 shows examples of a supplemental downlink mode (e.g., licensed assisted access (LAA) mode) and of a carrier aggregation mode for an LTE network that supports LTE/LTE-A extended to contention-based shared spectrum. The diagram 200 may be an example of portions of the system 100 of FIG. 1. Moreover, the base station 105-*a* may be an example of the base stations 105 of FIG. 1, while the UEs 115-*a* may be examples of the UEs 115 of FIG. 1.

In the example of a supplemental downlink mode (e.g., LAA mode) in diagram 200, the base station 105-*a* may transmit OFDMA communications signals to a UE 115-*a* using a downlink 205. The downlink 205 is associated with a frequency F1 in an unlicensed spectrum. The base station 105-*a* may transmit OFDMA communications signals to the same UE 115-*a* using a bidirectional link 210 and may receive SC-FDMA communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-*a* may transmit OFDMA communications signals to a UE 115-*a* using a bidirectional link 215 and may receive SC-FDMA communications signals from the same UE 115-*a* using the bidirectional link 215. The bidirectional link 215 is associated with the frequency F1 in the unlicensed spectrum. The base station 105-*a* may also transmit OFDMA communications signals to the same UE 115-*a* using a bidirectional link 220 and may receive SC-FDMA communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit OFDMA communications signals to a UE 115-*a* using a bidirectional link 225 and may receive SC-FDMA communications signals from the same UE 115-*a* using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with or without contention-based shared spectrum for capacity offload.

As described above, the typical service provider that may benefit from the capacity offload offered by using LTE/LTE-A extended to contention-based spectrum is a traditional MNO with LTE spectrum. For these service providers, an operational configuration may include a bootstrapped mode (e.g., supplemental downlink (e.g., LAA mode), carrier aggregation) that uses the LTE primary component carrier (PCC) on the non-contention spectrum and the LTE secondary component carrier (SCC) on the contention-based spectrum.

In the supplemental downlink mode, control for LTE/LTE-A extended to contention-based spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A extended to contention-based shared spectrum (e.g., bidirectional links 215 and 225). The carrier aggregation mechanisms supported when using LTE/LTE-A extended to contention-based shared spectrum may fall under a hybrid frequency division duplexing-time division duplexing (FDD-TDD) carrier aggregation or a TDD-TDD carrier aggregation with different symmetry across component carriers.

Figure 2B:
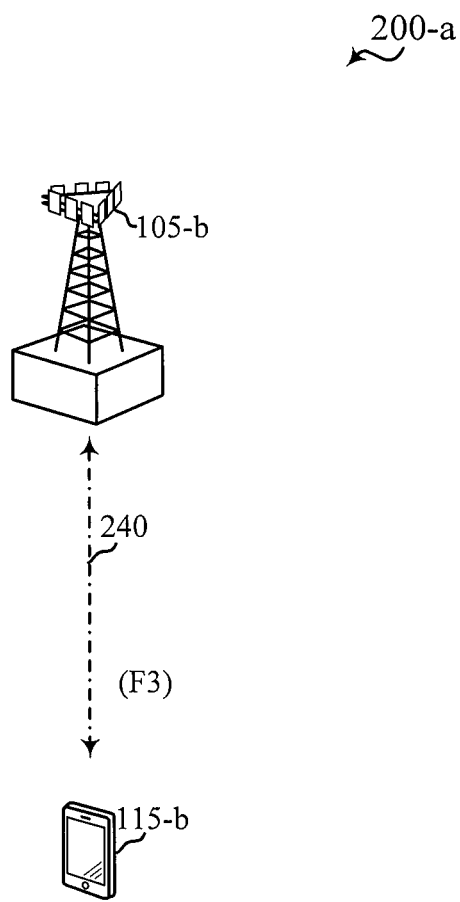
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE/LTE-A extended to contention-based shared spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 105 or 105-a described with reference to FIG. 1, 2A, or 2B, or one of the UEs 115, 115-a, or 115-b described with reference to FIG. 1, 2A, or 2B, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2A and 2B are provided as an example. In practice, wireless communication system 200 may include additional devices, fewer devices, different devices, or differently arranged devices than those shown in FIGS. 2A and 2B.

Figure 3:
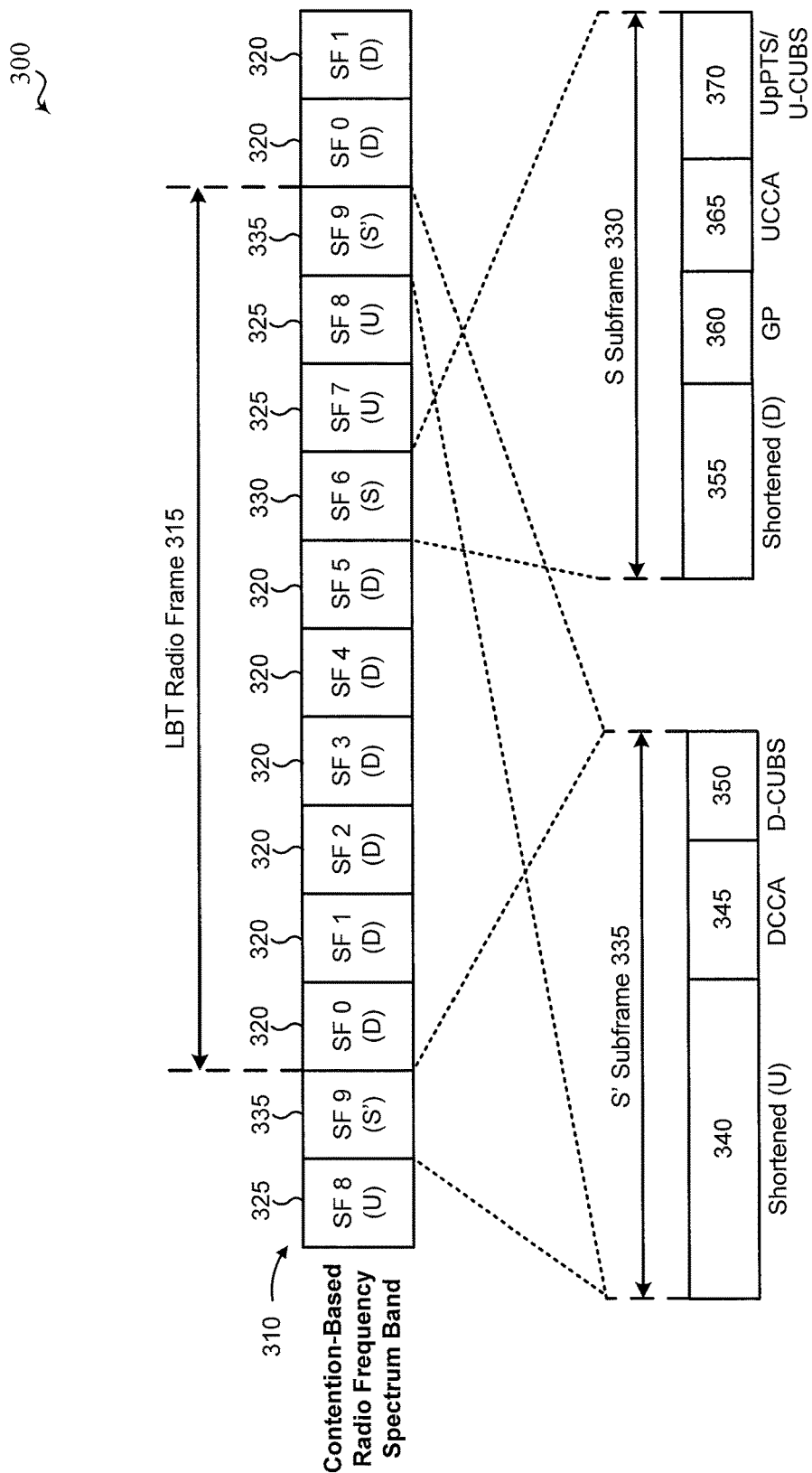
FIG. 3 is an illustration of an example of a wireless communication over an unlicensed radio frequency spectrum band, in accordance with various aspects of the present disclosure.

FIG. 3 is an illustration of an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (CCA) procedure 345 may be performed by one or more base stations, such as one or more of the base stations 105, 205, or 205-a described with reference to FIG. 1 or 2, to reserve, for a period of time, a channel of the contention-based shared radio frequency spectrum band over which the wireless communication 310 occurs. Following a successful downlink CCA procedure 345 by a base station, the base station may transmit a preamble, such as a channel usage beacon signal (CUBS) (e.g., a downlink CUBS (D-CUBS 350)) to provide an indication to other base stations or apparatuses (e.g., UEs, WiFi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 350 may in some examples take a form similar to that of an LTE/LTE-A cell-specific reference signal (CRS) or a channel state information reference signal (CSI-RS). When the downlink CCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period 340. A second portion of the S' subframe 335 may be used for the downlink CCA procedure 345. A third portion of the S' subframe 335 may be used by one or more base stations that successfully contend for access to the channel of the contention-based shared radio frequency spectrum band to transmit the D-CUBS 350.

During the S subframe 330, an uplink CCA procedure 365 may be performed by one or more UEs, such as one or more of the UEs 115, 215, 215-a, 215-b, or 215-c described above with reference to FIG. 1, 2A, or 2B, to reserve, for a period of time, the channel over which the wireless communication 310 occurs. Following a successful uplink CCA procedure 365 by a UE, the UE may transmit a preamble, such as an uplink CUBS (U-CUBS 370) to provide an indication to other UEs or apparatuses (e.g., base stations, WiFi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 370 may in some examples take a form similar to that of an LTE/LTE-A CRS or CSI-RS. When the uplink CCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the uplink CCA procedure 365. A fourth portion of the S subframe 330 may be used by one or more UEs that successfully contend for access to the channel of the contention-based radio frequency spectrum band as an uplink pilot time slot (UpPTS) or to transmit the U-CUBS 370.

In some examples, the downlink CCA procedure 345 or the uplink CCA procedure 365 may include the performance of a single CCA procedure. In other examples, the downlink CCA procedure 345 or the uplink CCA procedure 365 may include the performance of an extended CCA procedure. The extended CCA procedure may include a random number of CCA procedures, and in some examples may include a plurality of CCA procedures.

As indicated above, FIG. 3 is provided as an example. Other examples are possible and may differ from what was described in connection with FIG. 3.

Figure 4:
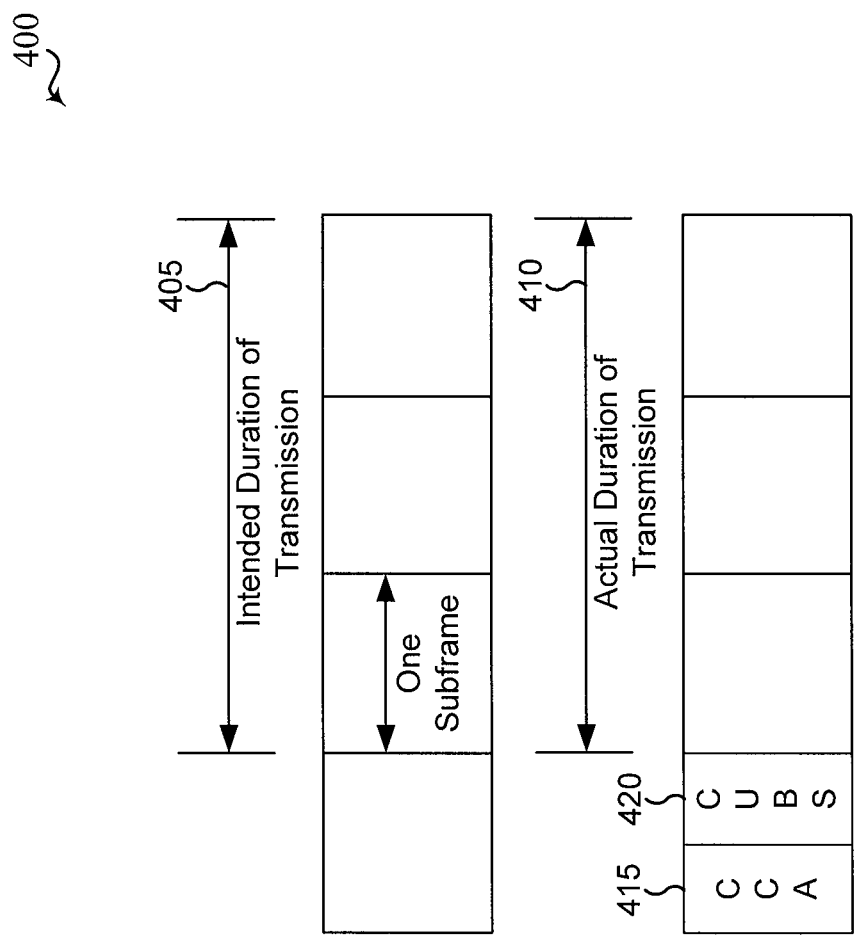
FIG. 4 is an illustration of an example of a CCA procedure performed by a transmitting apparatus when contending for access to a contention-based shared radio frequency spectrum band, in accordance with various aspects of the present disclosure.

FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the downlink CCA procedure 345 or uplink CCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a channel reserving signal, such as a CUBS 420, may be transmitted, followed by a data transmission (e.g., an uplink transmission or a downlink transmission). By way of example, the data transmission may have an intended duration 405 of three subframes and an actual duration 410 of three subframes.

As indicated above, FIG. 4 is provided as an example. Other examples are possible and may differ from what was described in connection with FIG. 4.

Figure 5:
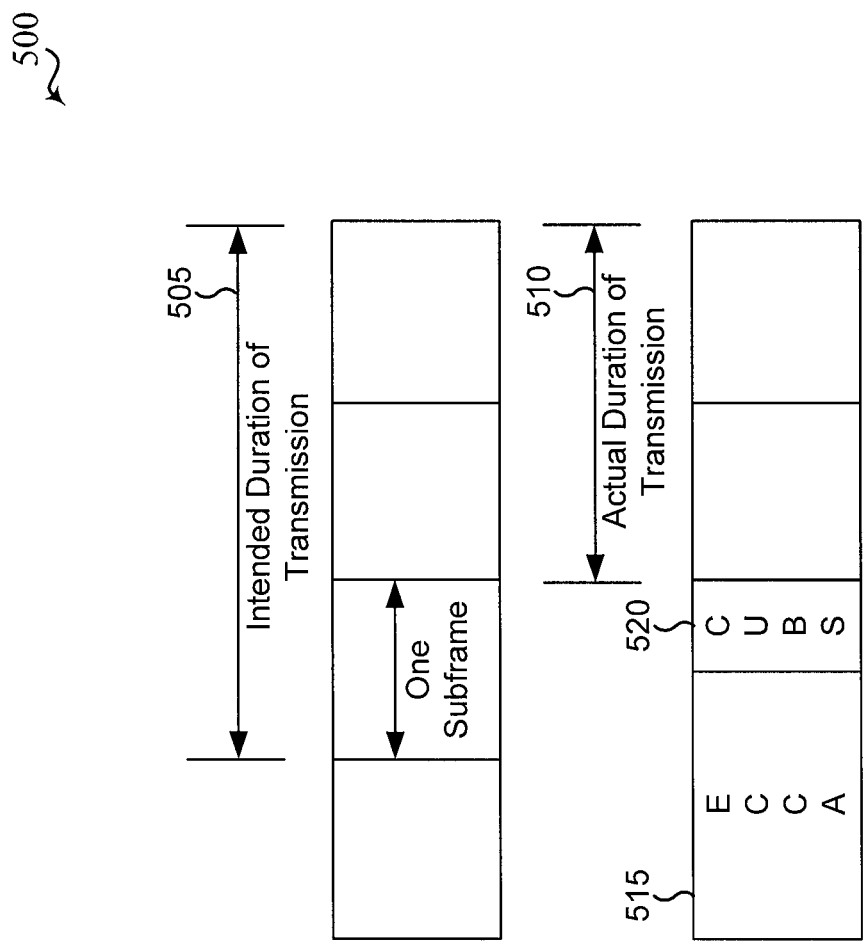
FIG. 5 is an illustration of an example of an extended CCA (ECCA) procedure performed by a transmitting apparatus when contending for access to a contention-based shared radio frequency spectrum band, in accordance with various aspects of the present disclosure.

FIG. 5 is an illustration of an example 500 of an extended CCA (ECCA) procedure 515 performed by a transmitting apparatus when contending for access to a contention-based shared radio frequency spectrum band, in accordance with various aspects of the present disclosure. In some examples, the ECCA procedure 515 may be an example of the downlink CCA procedure 345 or uplink CCA procedure 365 described with reference to FIG. 3. The ECCA procedure 515 may include a random number of CCA procedures, and in some examples may include a plurality of CCA procedures. The ECCA procedure 515 may, therefore, have a variable duration. In some examples, the ECCA procedure 515 may be performed in accordance with an LBT-load based equipment (LBT-LBE) protocol (e.g., the LBT-LBE protocol described by EN 301 893). The ECCA procedure 515 may provide a greater likelihood of winning contention to access the contention-based shared radio frequency spectrum band, but at a potential cost of a shorter data transmission. Following the ECCA procedure 515, a channel reserving signal, such as a CUBS 520, may be transmitted, followed by a data transmission. By way of example, the data transmission may have an intended duration 505 of three subframes and an actual duration 510 of two subframes.

As indicated above, FIG. 5 is provided as an example. Other examples are possible and may differ from what was described in connection with FIG. 5.

Figure 6:
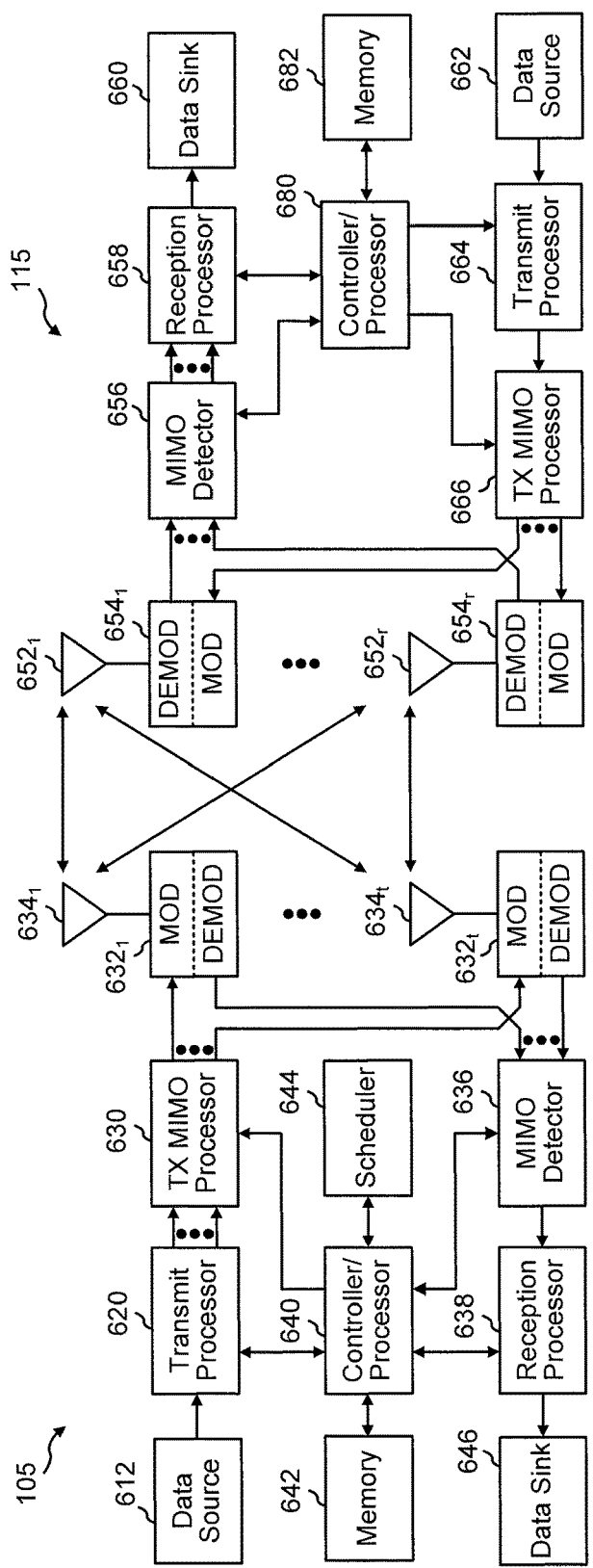
FIG. 6 shows a block diagram of a design of a base station/eNB and a UE, which may be one of the base stations/eNBs and one of the UEs in FIG. 1.

FIG. 6 shows a block diagram of a design of a base station/eNB 105 and a UE 115, which may be one of the base stations/eNBs and one of the UEs in FIG. 1. The eNB 105 may be equipped with antennas 634a through 634t, and the UE 115 may be equipped with antennas 652a through 652r.

At the eNB 105, a transmit processor 620 may receive data from a data source 612 and control information from a controller/processor 640. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 620 may process (e.g., encode and symbol map) the data and control information to obtain data symbols and control symbols, respectively. The transmit processor 620 may also generate reference symbols, e.g., for the primary synchronization signal (PSS), secondary synchronization signal (SSS), and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 115, the antennas 652a through 652r may receive the downlink signals from the eNB 105 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 115 to a data sink 660, and provide decoded control information to a controller/processor 680.

On the uplink, at the UE 115, a transmit processor 664 may receive and process data (e.g., for the physical uplink shared channel (PUSCH)) from a data source 662 and control information (e.g., for the physical uplink control channel (PUCCH)) from the controller/processor 680. The transmit processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the eNB 105. At the eNB 105, the uplink signals from the UE 115 may be received by the antennas 634, processed by the modulators 632, detected by a MIMO detector 636 if applicable, and further processed by a receive processor 638 to obtain decoded data and control information sent by the UE 115. The processor 638 may provide the decoded data to a data sink 646 and the decoded control information to the controller/processor 640.

The controllers/processors 640 and 680 may direct the operation at the eNB 105 and the UE 115, respectively. The controller/processor 640 and/or other processors and modules at the eNB 105 may perform or direct the execution of various processes for the techniques described herein. The controllers/processor 680 and/or other processors and modules at the UE 115 may also perform or direct the execution of the functional blocks illustrated in FIGS. 8 and 10, and/or other processes for the techniques described herein. The memories 642 and 682 may store data and program codes for the eNB 105 and the UE 115, respectively. A scheduler 644 may schedule UEs for data transmission on the downlink and/or uplink.

A device, such as a UE, may have multiple antennas (N) to use for receiving and/or transmitting signals. The device may divide the use and assignment of the antennas to use for particular radio access technologies (RATs), such as LTE, WiFi, etc., for particular carrier frequencies, or both. For example, the device may use a fixed number of antennas for one carrier in CA cases, or it may use a fixed number of antennas for WiFi when the device supports both WiFi and other technologies, such as LTE. In one example, a UE may have four antennas and assign two of the antennas for WiFi communication and two antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as channel quality indicator (CQI), reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

UEs and base stations routinely make physical layer measurements of the radio frequency characteristics. These measurements may be used by the device making the measurement to determine whether to hand over, adjust power, schedule transmissions, or the like. For example, reference signal receive power (RSRP) can, among other things, be used by a UE in ranking neighboring cells, while reference signal receive quality (RSRQ) can, among other things, be used by the UE in deciding which of the neighbor cells to select for handover or cell reselection. Measurements may also be used as a part of feedback to the other device. For example, the UE may measure a type of signal-to-noise ratio in order to select the appropriate channel quality indicator (CQI) for CQI reporting, which the base station will consider when scheduling an appropriate modulation and coding scheme (MCS). Many of these measurements made by a UE are measurements of reference signals transmitted from the base stations. The signals for which a UE performs RSRP measurement could be common reference signals (CRS), extended common reference signals (eCRS), channel state indicator reference signals (CSI-RS), and the like.

Figure 7:
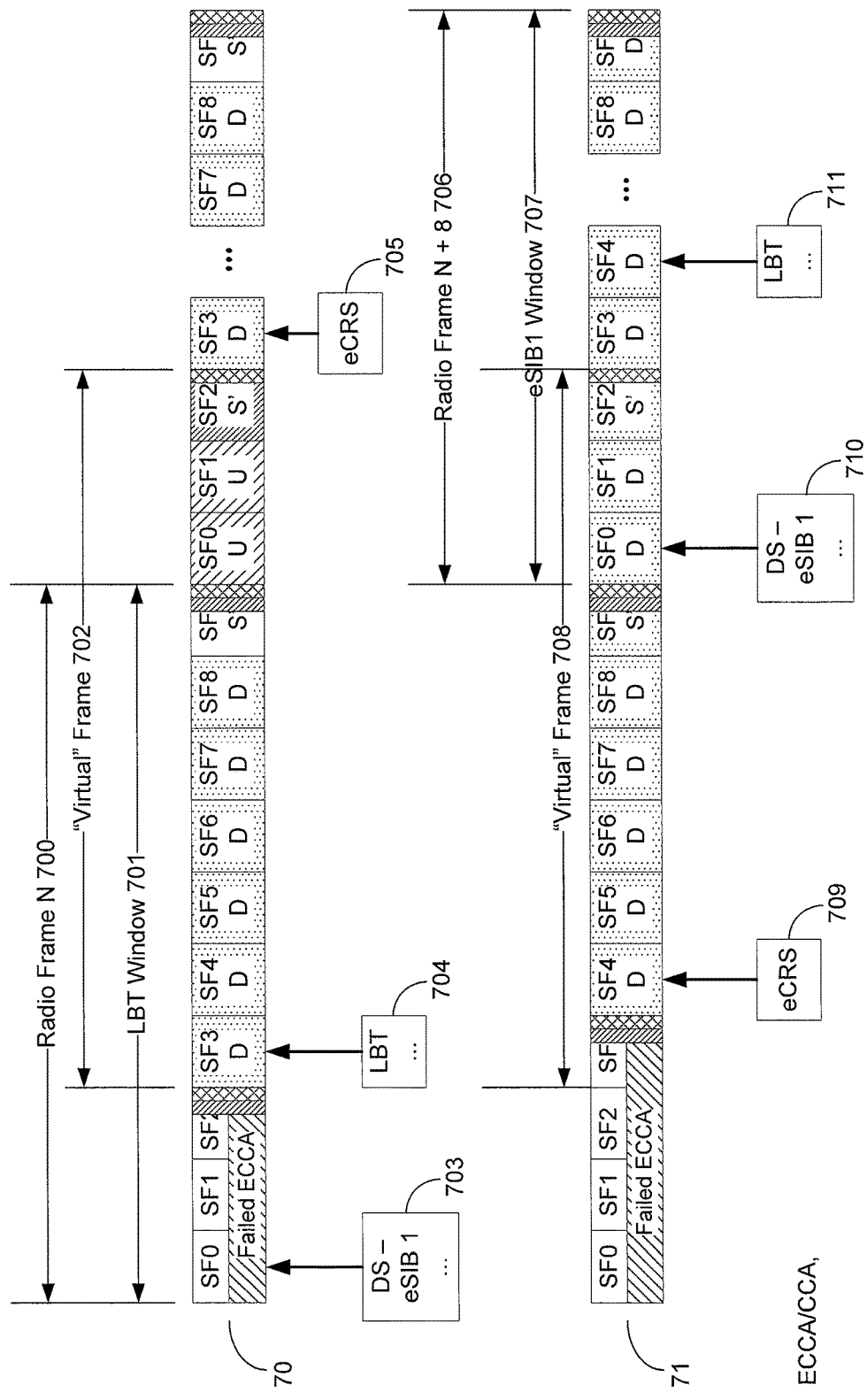
FIG. 7 is a block diagram illustrating transmission streams over a contention-based spectrum.

FIG. 7 is a block diagram illustrating transmission streams 70 and 71 over a contention-based spectrum. Transmission streams 70 and 71 reflect the subframe structure and communications over the contention-based spectrum. In transmission stream 70, radio frame N 700, which coincides with the listen before talk (LBT) window 701, begins at subframe 0 and ends at subframe 9. As illustrated, during the first three subframes, no transmissions occur because of a failed extended clear channel assessment (ECCA). Virtual frame 702 begins after a successful CCA and CUBS transmission at the end of subframe 2. Thus, transmissions may begin with LBT 704 in subframe 3, as the first subframe in virtual frame 702. In transmission stream 71, virtual frame 708 begins at subframe 3 and end at the end of subframe 2 in radio frame N+8 706, which coincides with enhanced SIB1 (eSIB1) window 707.

In LTE/LTE-A systems that include contention-based spectrum, eCRS may be transmitted in a discovery reference signal (DRS), which may include guaranteed transmissions at periodic boundaries (e.g., 40 ms, 80 ms, 160 ms, etc.) eCRS may also be transmitted opportunistically during a subframe 0, if the base station is transmitting in that subframe, and may also be transmitted during the first subframe of a virtual LBT frame. Thus, in transmission streams 70 and 71, eCRS may be transmitted with transmission 703 of DS and eSIB1, along with LBT 704 and at the first subframe, eCRS 705, of the virtual frame after virtual frame 702, at the first subframe, eCRS 709, of virtual frame 708, with the transmission 710 of DRS and eSIB1 at subframe 0 of radio frame N+8 706, and at LBT 711. However, because transmission of the reference signal is not always guaranteed over contention-based spectrum, any measurements that may be performed on that reference signal are also not guaranteed.

Considering the characteristics of LTE/LTE-A networks that include contention-based spectrum, the quality of any measurement based signal (e.g., eCRS, CRS, CSI-RS, etc.), cannot be guaranteed because there is no guarantee that the measurement based signal is even transmitted, and, even when transmitted, the signal may be influenced by bursty transmission. Due to the uncertainty of such measurement signals, consideration should be made how to provide further information on this uncertainty for any measurements performed by a UE on uncertain measurement signals.

Various aspects of the present disclosure provide for implementation options for reporting and measurements of measurement signals transmitted as a part of LTE/LTE-A networks that include contention-based spectrum. In one specific example, a measurement signal may be an eCRS and the measurement to perform and report is an RSRP. If a UE performs RSRP based on eCRS, but the eCRS is either not transmitted or subject to heavy interference, the measurement may be significantly noisy and may fail to capture the long term pathloss. According to one aspect, in order to avoid this problem, a UE configured according to one aspect of the present disclosure performs eCRS thresholding by estimating the noise associated with the eCRS (e.g., signal to noise ratio (SNR), signal to interference and noise ratio (SINR), signal to interference ratio (SIR), and the like), and then only taking the RSRP measured based on an eCRS exceeding the threshold as a candidate for a valid RSRP measurement.

Figure 8:
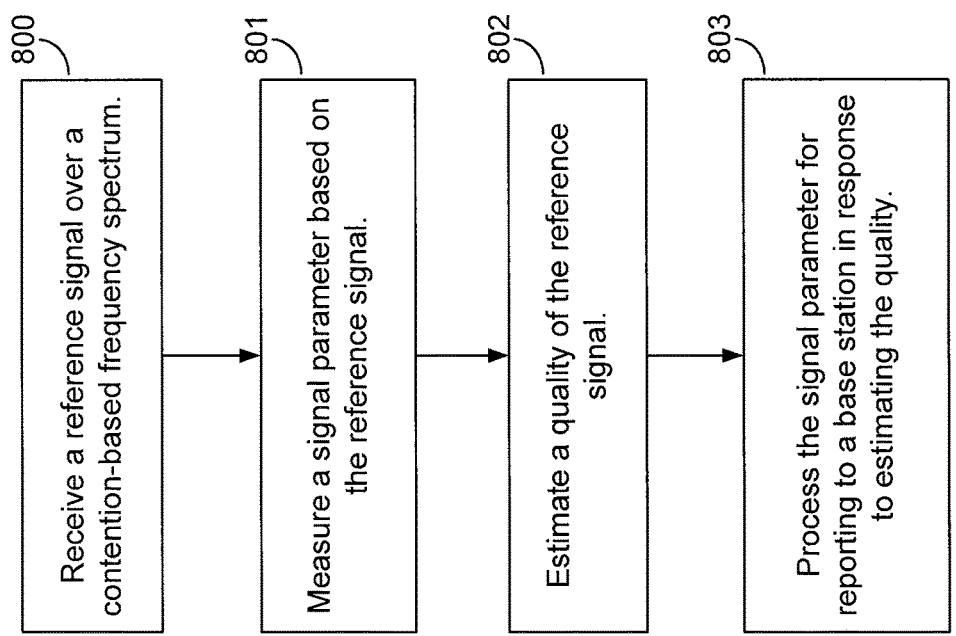
FIG. 8 is a block diagram illustrating example blocks executed to implement one aspect of the present disclosure.

FIG. 8 is a block diagram illustrating example blocks executed to implement one aspect of the present disclosure. At block 800, a UE receives a reference signal over a contention-based frequency spectrum. For example, in an unlicensed shared spectrum with contention-based access, a UE receives a reference signal, such as eCRS, CRS, CSI-RS, and the like.

At block 801, the UE measures a signal parameter based on the reference signal. In one example aspect, when receiving the eCRS, the UE may perform an expected measurement on the measurement signal, such as by measuring the RSRP using the eCRS.

At block 802, the UE estimates a quality of the reference signal. For example, the UE may measure the signal quality by estimating the SNR, SINR, SIR, of the like of the received signal.

At block 803, the UE processes the signal parameter for reporting to a base station in response to estimating the quality. In one example aspect, the estimated signal quality may be compared against a predetermined threshold. If the estimated quality exceeds that threshold, the UE may designate the measured signal parameter (e.g., RSRP, CQI, RSRQ, etc.) for reporting to a base station. Thus, when the signal quality of the received reference signal does not meet the threshold, the resulting signal parameter may not be as accurate of a measure of long term pathloss or the channel state information because the reference signal either was not actually transmitted or was subject to too much interference.

Figure 9:
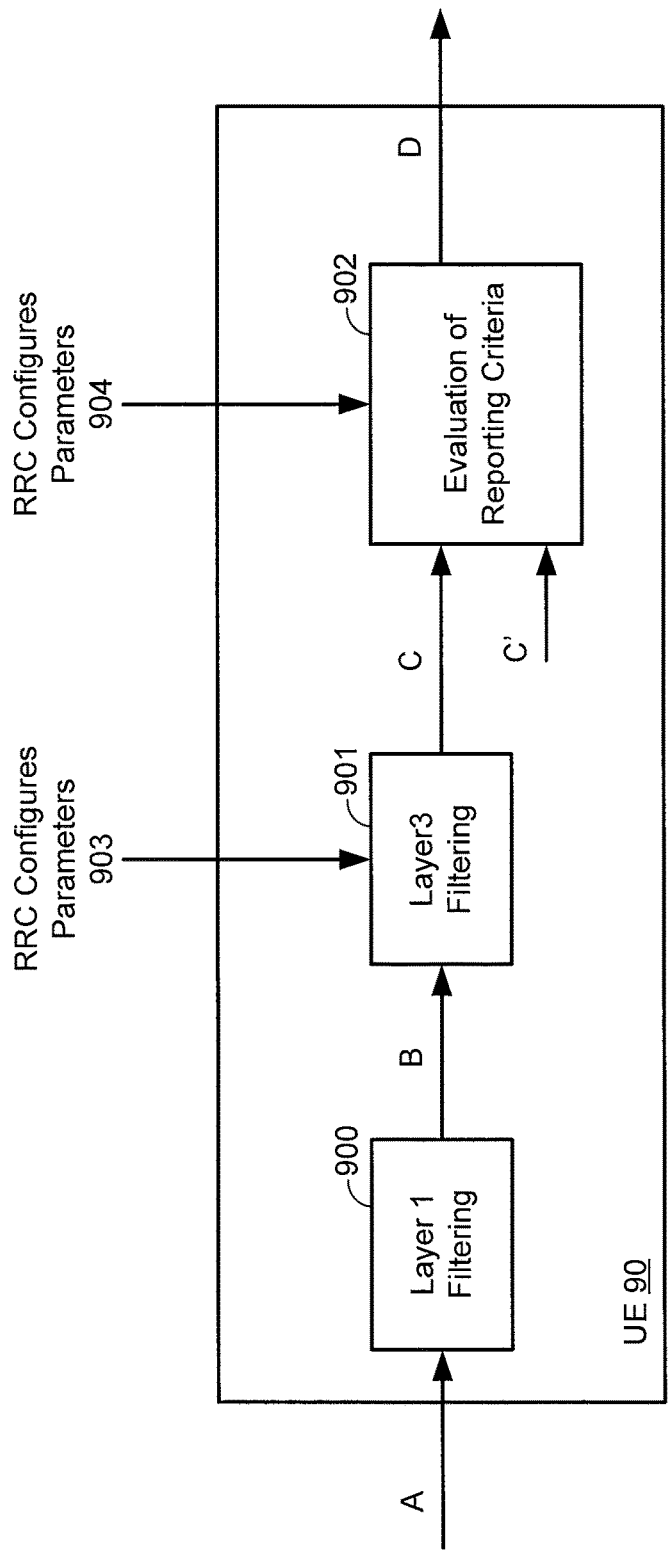
FIG. 9 is a block diagram illustrating a measurement model within a UE for taking and reporting signal parameter measurements.

FIG. 9 is a block diagram illustrating a measurement model within a UE 90 for taking and reporting RSRP measurements. The measurement model of UE 90 is defined in the LTE Technical Specification (TS) 36.300. The purpose of RSRP measurement is to keep track of the long term signal power for cells monitored. According to the illustrated model, measurements, A, (e.g., samples) taken internal to the physical layer are input into Layer 1 filtering 900. Layer 1 filtering 900 provides internal filtering of the inputs measured at point A. The exact method or type of filtering is generally implementation dependant. How the measurements are actually executed in the physical layer by an implementation (inputs A and Layer 1 filtering 900) are not constrained by the standard. The output of Layer 1 filtering 900 are filtered measurements, B. The filtered measurements, B, are then reported by layer 1 to layer 3, for Layer 3 filtering 901. Layer 3 filtering 901 provides standardized filtering in which the layer 3 filters are configured via RRC signalling 903. Filtering reporting period at C equals one measurement period at B. Thus, C is the filtered measurement after processing in the layer 3 filter. The reporting rate may be the same as the reporting rate at point B. This measurement at C is used as input for one or more evaluations of reporting criteria 902. Evaluations of reporting criteria 902 checks whether the actual measurement reporting is necessary at point D. The evaluation may be based on more than one flow of measurements at reference point C, e.g. to compare between different measurements. The different flow of measurements is represented by C'. UE 90 evaluates the reporting criteria at least every time a new measurement result is reported at point C, C'. The reporting criteria are also standardized and with the configuration for the reporting provided by RRC signalling 904. Once the standardized criteria are met, as determined at evaluations of reporting criteria 902, the final UE measurement report, D, may be transmitted on the radio interface.

Layer 1 filtering 900 may introduce a certain level of measurement averaging. The time and rate at which UE 90 will perform the physical measurements at A may be implementation specific to a point where the performance requirements of the output measurements, B, are met. The Layer 3 filtering 901 and RRC signaling 903 used for configuration are specified in the standards and do not introduce any delay in the sample availability between B and C. The measurements at points C, C' may be the input used in the evaluation of reporting criteria 902.

Layer 3 filtering is defined according to the following equation:

$$F_n = (1-a) \cdot F_{n-1} + a \cdot M_n \qquad (1)$$

where, $M_n$ is the latest received measurement result from the physical layer; $F_n$ is the updated filtered measurement result, that is used for evaluation of reporting criteria or for measurement reporting; $F_{n-1}$ is the previous filtered measurement result, where $F_0$ is set to $M_1$ when the first measurement result from the physical layer is received; and $a = \frac{1}{2}^{(k/4)}$, where k is a filter coefficient for the corresponding measurement quantity received by the configuration parameters, RRC signaling 903. The filters for Layer 3 filtering 901 may be adapted such that the time characteristics of the filter are preserved at different input rates, observing that the filter coefficient k assumes a sample rate of 200 ms.

It should be noted that if k is set to 0, no Layer 3 filtering 901 is applicable. Further, the filtering may be performed in the same domain as used for evaluation of reporting criteria or for measurement reporting, such as, for example, logarithmic filtering for logarithmic measurements. The filter input rate is implementation dependent in order to fulfill the performance requirements set in the standards.

It should further be noted that the performance requirements may be defined at output B, hence, the additional Layer 3 filtering 901 may not relax the RSRP measurement requirement. For this reason, in various aspects of the present disclosure, the filter coefficient, k, may be set to 0 with no Layer 3 filtering 901 applied.

In one example aspect, once raw RSRP measurements, at A, are obtained in the hardware and pushed back to the software of UE 90, Layer 1 filtering 900 in the software may select a number of raw RSRP measurements in the measurement period (default value may be 80 ms, 100 ms, 120 ms or the like, or even 200 ms as in legacy systems) and forms the RSRP report by averaging the selected raw RSRP measurements.

A single measurement can reflect the instantaneous signal strength of the subframe experienced. One RSRP measurement may be performed on the physical layer at A, UE 90 may then perform Layer 1 filtering 900 and Layer 3 filtering 901 for the measurement report, D. In order for the measurement results to reflect the long term path loss, UE 90 would typically make multiple independent measurement samples, A, for averaging. In order for the measurement samples to be independent, the measurements should be separated well enough in time so as not to include multiple measurements from nearly the same period. One example of a minimum measurement spacing may be 40 ms, which may be sufficient to guarantee the independence between the adjacent measurements even with low speed channels. Additional minimum measurement spacing times may include 30 ms, 50 ms, 60, ms, and the like. The actual number of measurements, N, and the measurement spacing, M, may be dictated by the performance requirement in the standards.

Various aspects of the present disclosure may provide for designating a signal parameter measurement, such as RSRP, RSRQ, CQI, and the like, as valid when the quality of the measurement signal exceeds a predetermined threshold and the time period between the current signal parameter measurement and the previous signal parameter measurement is no less than a minimum time threshold, M. Different actions may further be taken depending on whether a sufficient number of valid signal parameter measurements have occurred within the minimum time threshold, M.

Figure 10:
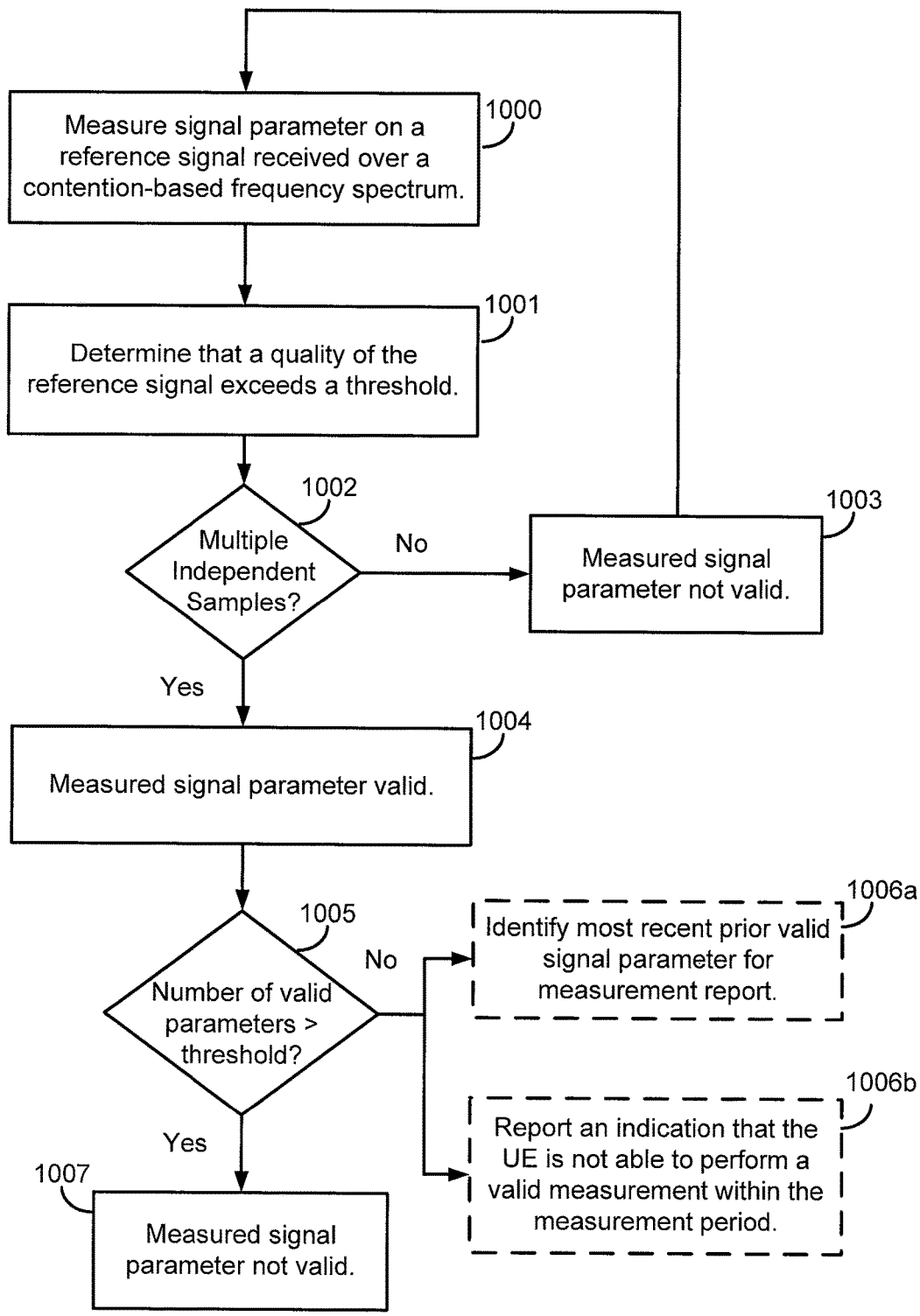
FIG. 10 is a block diagram illustrating example blocks executed to implement one aspect of the present disclosure.

FIG. 10 is a block diagram illustrating example blocks executed to implement one aspect of the present disclosure. At block 1000, a signal parameter is measured on a reference signal received over a contention-based frequency spectrum. For example, a reference or measurement signal may include eCRS, CRS, CSI-RS, and the like. A signal parameter, such as RSRP, RSRP, CQI, or the like may be measured from this measurement signal.

At block 1001, a determination is made that the quality of the reference signal exceeds a threshold. In one aspect, the quality of the reference signal or measurement signal, which may be determined based on a signal-to-noise ratio (e.g., SNR, SINR, SIR, etc.), may be compared against a threshold quality. The UE may then determine that the quality of the measurement signal is sufficient.

At block 1002, a determination is made whether there are multiple independent sample measurements. In order to accurately reflect the long term path loss, multiple independent measurement samples may be used and averaged. Thus, the number of measurement samples should not be taken closer in time than the minimum time threshold, M.

If the number measurement samples were taken without the appropriate spacing, in which multiple samples occur within the same time threshold, M, then, at block 1003, the signal parameters measured are determined by the UE not to be valid. The UE will return to the process at block 1000.

If, however, the number of measurement samples were taken with the appropriate spacing, at block 1004, the measured signal parameters are determined to be valid by the UE.

At block 1005, a determination is made whether the number of valid measured signal parameters is greater than a predetermined threshold. In order to accurately reflect a long term indication of the signal parameter, multiple valid signal parameter measurements are used.

If the number of valid measured signal parameters is not greater than the predetermined threshold, then, at block 1006a, the UE may identify the most recent prior valid signal parameter for the measurement report. In such instances, the UE will be reporting a measurement that does not change from the most recent report. Thus, the UE resorts back to the most recent valid measurements for the measurement report. Such mechanism may ensure that the measured signal parameter reflects the long term condition even when the base station is not able to access the medium or the base station sends the measurement signal, but it experiences interference at UE reception within the measurement period, M.

This scheme may work when the invalid measurement happens infrequently. One drawback to reporting the prior measurement in block 1006a is that the measurement may be outdated if the invalid measurements happen consistently. It should be noted that one option to alleviate this drawback may be for the base station to ignore the measurement report if it is not able to access the medium. However, the base station would not be able to differentiate whether the UE is experiencing interference, and, thus, may not be aware of the staleness of measurement report due to the UE interference situation.

In an alternative to block 1006a, if the number of valid measured signal parameters is not greater than the predetermined threshold, or the spacing between multiple independent measurements in time is larger than the maximum time threshold, then, at block 1006b, the UE may report an indication that the UE is not able to perform a valid measurement within the measurement period. With the alternative of block 1006b, the UE reports the indication to the base station in order to signal that the UE is not able to perform valid measurement in the measurement period because of bursty interference. This bursty indication could be either explicit, with a dedicated flag or bit, or implicit, via a predetermined measurement value agreed upon by both the UE and the base station. With the bursty indication transmitted to the base station, once the base station receives the measurement report, it can figure out that that the UE is experiencing bursty interference if the base station has access to the medium during the measurement period. This allows the base station to gain additional interference environment information on the UE, and the base station could use such knowledge for secondary cell (SCell) configuration, hand over operation, etc.

In one example aspect involving CQI, the UE may always resort back to the valid eCRS for the CQI report. However, if the serving base station also receives the bursty indication on the RSRP, but the CQI from the report is good, then the base station may infer that the CQI could be stale. Alternatively, the UE may report a CQI level 0 (out of range as defined in TS 36.213) to indicate that it does not receive valid reference signal for CSI measurement. eNB could either use previous channel state information feedback for scheduling when it receives the invalid indication on the feedback of channel state information or it could use an extrapolated CQI based on previous valid reports for scheduling or it could use some default CQI for scheduling.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8 and 10 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving by a processor, a signal over a contention-based frequency spectrum;
   measuring, by the processor, a signal parameter based on the received signal;
   estimating, by the processor, a quality of the received signal, wherein the estimating the quality includes measuring an interference level on the received signal;
   determining, by the processor, whether the quality of the received signal exceeds a predetermined quality threshold;
   in response to determining that the quality of the received signal exceeds the predetermined quality threshold, processing, by the processor, the signal parameter for reporting to a base station, wherein the determining that the quality of the received signal exceeds the predetermined quality threshold indicates that:
      the received signal was not subject to an interference level sufficient to render the measured signal parameter invalid; and
      the received signal includes a reference signal; and
   in response to determining that the quality of the received signal does not meet the predetermined quality threshold, excluding, by the processor, the processing of the signal parameter for reporting to the base station, wherein the determining that the quality of the received signal does not meet the predetermined quality threshold indicates that at least one of:
      the received signal was subject to an interference level sufficient to render the measured signal parameter invalid; and
      the received signal does not include the reference signal.

2. The method of claim 1, wherein the processing includes:
   determining, by the processor, a period of time since a last valid signal parameter; and
   identifying, by the processor, the signal parameter as a valid signal parameter in response to the period of time exceeding a minimum threshold.

3. The method of claim 2, further including:
   determining, by the processor, a number of signal parameter measurements during a current measurement period; and
   transmitting, by the processor, the valid signal parameter to the base station in response to the number of signal parameter measurements exceeding a minimum measurement threshold.

4. The method of claim 3, further including:
   determining, by the processor, the number of signal parameter measurements fails to exceed the minimum measurement threshold; and transmitting, by the processor, the last valid signal parameter in response to the number of signal parameter measurements failing to exceed the minimum measurement threshold.

5. The method of claim 3, further including:
   determining, by the processor, the number of signal parameter measurements fails to exceed the minimum measurement threshold; and
   transmitting, by the processor, an indication to the base station, wherein the indication notifies the base station that the number of signal parameters measurements has failed to exceed the minimum measurement threshold.

6. The method of claim 5, wherein the indication includes one of:
   an explicit hit indicator;
   an implicit indictor; or
   a predetermined signal parameter value.

7. An apparatus configured for wireless communication, comprising:
   means for receiving a signal over a contention-based frequency spectrum;
   means for measuring a signal parameter based on the received signal;
   means for estimating a quality of the received signal, wherein the estimating the quality includes measuring an interference level on the received signal;
   means for determining whether the quality of the received signal exceeds a predetermined quality threshold;
   means, executable in response to a determination that the quality of the received signal exceeds the predetermined quality threshold, for processing the signal parameter for reporting to a base station, wherein the determination that the quality of the received signal exceeds the predetermined quality threshold indicates that:
      the received signal was not subject to an interference level sufficient to render the measured signal parameter invalid; and
      the received signal includes a reference signal; and
   means, executable in response to a determination that the quality of the received signal does not meet the predetermined quality threshold, for excluding the processing of the signal parameter for reporting to the base station, wherein the determination that the quality of the received signal does not meet the predetermined quality threshold indicates that at least one of:
      the received signal was subject to an interference level sufficient to render the measured signal parameter invalid; and
      the received signal does not include the reference signal.

8. The apparatus of claim 7, wherein the means for processing includes:
   means for determining a period of time since a last valid signal parameter; and
   means for identifying the signal parameter as a valid signal parameter in response to the period of time exceeding a minimum threshold.

9. The apparatus of claim 8, further including:
   means for determining a number of signal parameter measurements during a current measurement period; and
   means for transmitting the valid signal parameter to the base station in response to the number of signal parameter measurements exceeding a minimum measurement threshold.

10. The apparatus of claim 9, further including:
    means for determining the number of signal parameter measurements fails to exceed the minimum measurement threshold; and
    means for transmitting the last valid signal parameter in response to the number of signal parameter measurements failing to exceed the minimum measurement threshold.

11. The apparatus of claim 9, further including
    means for determining the number of signal parameter measurements fails to exceed the minimum measurement threshold; and
    means for transmitting an indication to the base station, wherein the indication notifies the base station that the number of signal parameters measurements has failed to exceed the minimum measurement threshold.

12. The apparatus of claim 11, wherein the indication includes one of:
    an explicit bit indicator;
    an implicit indictor; or
    a predetermined signal parameter value.

13. A non-transitory computer-readable medium having program code recorded thereon, the program code comprising:
    program code for causing a computer to receive a signal over a contention-based frequency spectrum;
    program code for causing the computer to measure a signal parameter based on the received signal;
    program code for causing the computer to estimate a quality of the received signal, wherein the estimating the quality includes measuring an interference level on the received signal;
    program code for causing the computer to determine whether the quality of the received signal exceeds a predetermined quality threshold;
    program code, executable in response to execution of the program code for causing the computer to determine that the quality of the received signal exceeds the predetermined quality threshold, for causing the computer to process the signal parameter for reporting to a base station, wherein a determination that the quality of the received signal exceeds the predetermined quality threshold indicates that:
       the received signal was not subject to an interference level sufficient to render the measured signal parameter invalid; and
       the received signal includes a reference signal; and
    program code, executable in response to execution of the program code for causing the computer to determine that the quality of the received signal does not meet the predetermined quality threshold, for causing the computer to exclude the processing of the signal parameter for reporting to the base station, wherein a determination that the quality of the received signal does not meet the predetermined quality threshold indicates that at least one of:
       the received signal was subject to an interference level sufficient to render the measured signal parameter invalid; and
       the received signal does not include the reference signal.

14. The non-transitory computer-readable medium of claim 13, wherein the program code for causing the computer to process includes:
    program code for causing the computer to determine a period of time since a last valid signal parameter; and program code for causing the computer to identify the signal parameter as a valid signal parameter in response to the period of time exceeding a minimum threshold.

15. The non-transitory computer-readable medium of claim 14, further including:
program code for causing the computer to determine a number of signal parameter measurements during a current measurement period; and
program code for causing the computer to transmit the valid signal parameter to the base station in response to the number of signal parameter measurements exceeding a minimum measurement threshold.

16. The non-transitory computer-readable medium of claim 15, further including:
program code for causing the computer to determine the number of signal parameter measurements fails to exceed the minimum measurement threshold; and
program code for causing the computer to transmit the last valid signal parameter in response to the number of signal parameter measurements failing to exceed the minimum measurement threshold.

17. The non-transitory computer-readable medium of claim 15, further including:
program code for causing the computer to determine the number of signal parameter measurements fails to exceed the minimum measurement threshold; and
program code for causing the computer to transmit an indication to the base station, wherein the indication notifies the base station that the number of signal parameters measurements has failed to exceed the minimum measurement threshold.

18. The non-transitory computer-readable medium of claim 17, wherein the indication includes one of:
an explicit bit indicator;
an implicit indictor; or
a predetermined signal parameter value.

19. An apparatus configured for wireless communication, the apparatus comprising:
at least one processor; and
a memory coupled to the at least one processor,
wherein the at least one processor is configured:
to receive a signal over a contention-based frequency spectrum;
to measure a signal parameter based on the received signal;
to determine whether the quality of the received signal exceeds a predetermined quality threshold;
to estimate a quality of the received signal, wherein the estimating the quality includes measuring an interference level on the received signal; and
to process the signal parameter for reporting to a base station in response to a determination that the quality of the received signal exceeds the predetermined quality threshold, wherein the determination that the quality of the received signal exceeds the predetermined quality threshold indicates that:
the received signal was not subject to an interference level sufficient to render the measured signal parameter invalid; and
the received signal includes a reference signal; and
to exclude processing of the signal parameter for reporting to a base station in response to a determination that the quality of the received signal does not meet the predetermined quality threshold, wherein a determination that the quality of the received signal does not meet the predetermined quality threshold indicates that at least one of:
the received signal was subject to an interference level sufficient to render the measured signal parameter invalid; and
the received signal does not include the reference signal.

20. The apparatus of claim 19, wherein the configuration of the at least one processor to process includes configuration of the at least one processor:
to determine a period of time since a last valid signal parameter; and
to identify the signal parameter as a valid signal parameter in response to the period of time exceeding a minimum threshold.

21. The apparatus of claim 20, further including configuration of the at least one processor:
to determine a number of signal parameter measurements during a current measurement period; and
to transmit the valid signal parameter to the base station in response to the number of signal parameter measurements exceeding a minimum measurement threshold.

22. The apparatus of claim 21, further including configuration of the at least one processor:
to determine the number of signal parameter measurements fails to exceed the minimum measurement threshold; and
to transmit the last valid signal parameter in response to the number of signal parameter measurements failing to exceed the minimum measurement threshold.

23. The apparatus of claim 21, further including configuration of the at least one processor:
to determine the number of signal parameter measurements fails to exceed the minimum measurement threshold; and
to transmit an indication to the base station, wherein the indication notifies the base station that the number of signal parameters measurements has failed to exceed the minimum measurement threshold.

24. The apparatus of claim 23, wherein the indication includes one of:
an explicit bit indicator;
an implicit indictor; or
a predetermined signal parameter value.

* * * * *